United States Patent [19]

Nordstrom et al.

[11] 3,741,327
[45] June 26, 1973

[54] WEIGHING DEVICE

[76] Inventors: Kjell Helge Nordstrom, Avsynargat 15; Rune Nils Allan Flinth, Rottargat 2, both of Vesteros, Sweden

[22] Filed: Oct. 13, 1971

[21] Appl. No.: 188,957

[52] U.S. Cl. ................................................ 177/163
[51] Int. Cl. ........................................... G01g 21/22
[58] Field of Search ................... 177/134, 136, 163, 177/211

[56] References Cited
UNITED STATES PATENTS

| | | | |
|---|---|---|---|
| 3,155,184 | 11/1964 | Raskin | 177/163 |
| 3,085,642 | 4/1963 | Raskin | 177/134 |
| 3,347,326 | 10/1967 | Raskin | 177/163 |
| 3,554,025 | 1/1971 | Andersson et al. | 177/211 X |
| 3,642,081 | 2/1972 | Hebert | 177/163 |
| 3,159,227 | 12/1964 | Raskin et al. | 177/163 |

FOREIGN PATENTS OR APPLICATIONS 950,493  9/1949  France ................................ 177/163

Primary Examiner—George H. Miller, Jr.
Attorney—Yount & Tarolli

[57] ABSTRACT

A device for static or dynamic weighing of railway guided vehicles comprising a weigh rail adapted to replace a section of the normal rails with the weigh rail being supported at its ends independent of the adjacent rails and with shear sensing strain gages along the side surfaces of the rail and arranged on the neutral axis of the rail for sensing the load applied to the rail. The device may further include start and stop measuring gages on the weigh rail, an arrangement for providing side guiding of the weigh rail, a structural beam foundation for the weigh rail and spacer means for maintaining the spacing of the adjacent rail ends.

17 Claims, 17 Drawing Figures

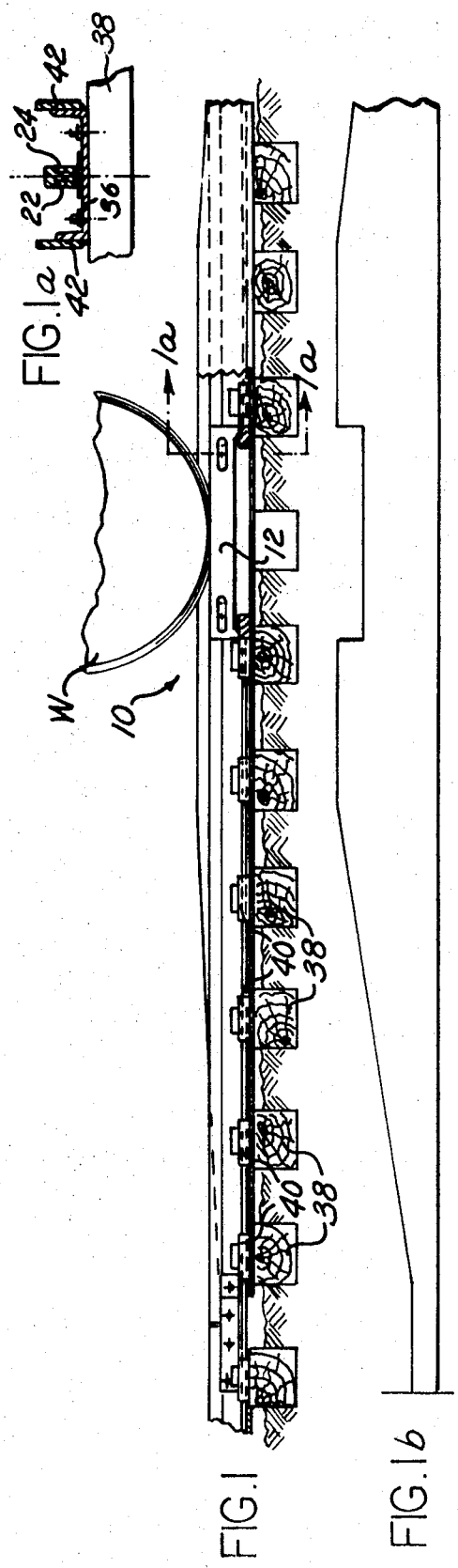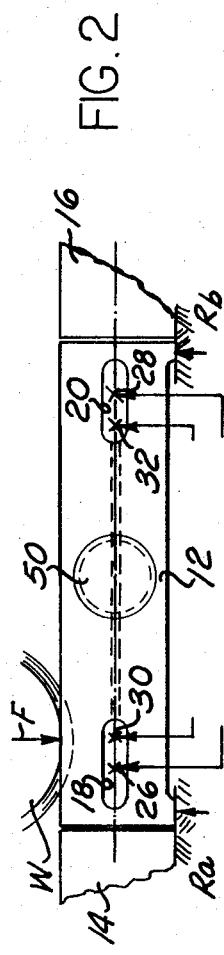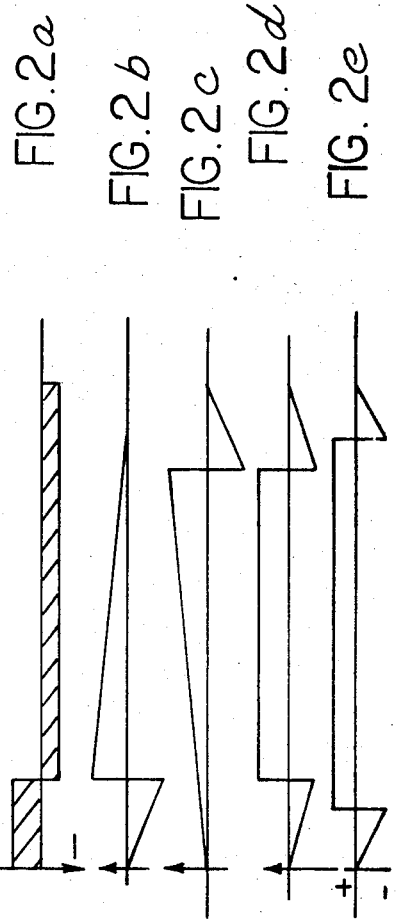

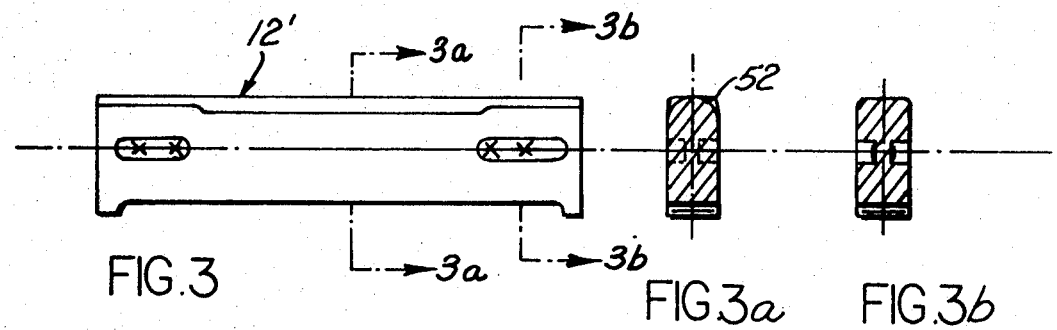
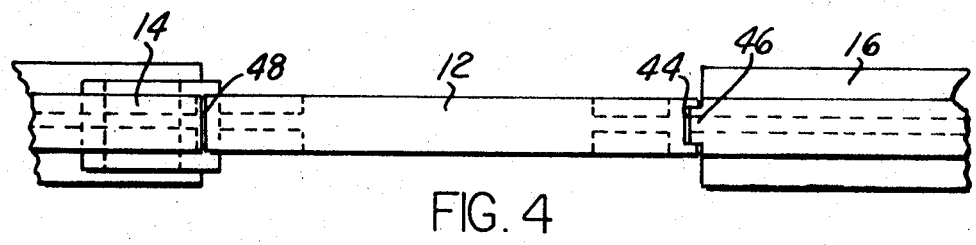
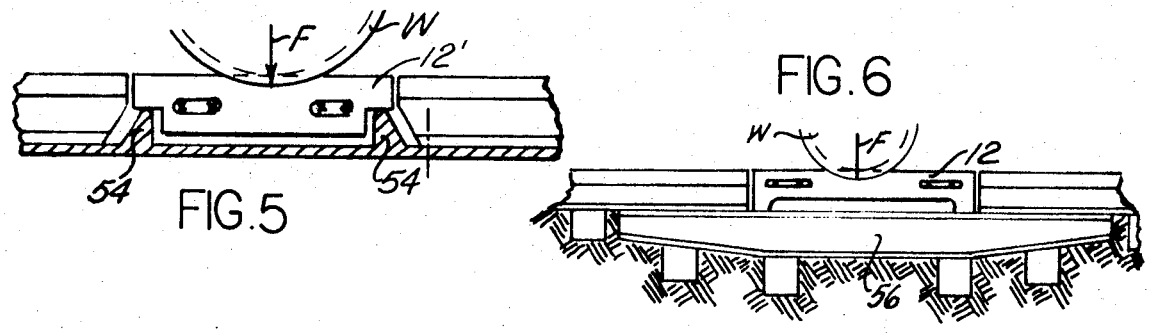
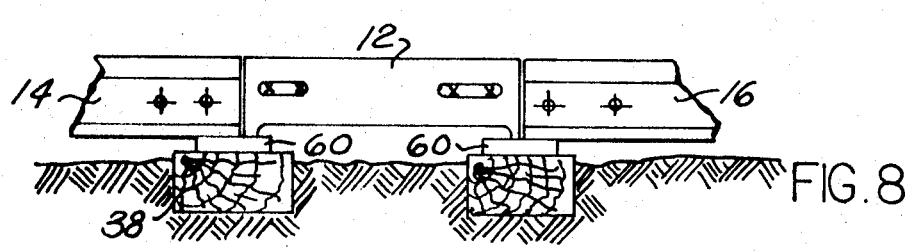

WEIGHING DEVICE

This invention relates to weighing devices and, more particularly, to a device for the static or dynamic weighing of railway guided vehicles.

It is well known that weighing of railway guided vehicles can be accomplished by means of stationary platform scales which are arranged in weighing pits in the path of the vehicle. Typical of such arrangements is the provision on the upper surface of the platform of a rail of some kind, as for example, a channel beam for a vehicle having rubber wheels or a rail in the case of railway cars. In either instance, the wheel engaging surface of the rail carried by the platform is in the same plane as the corresponding surface on the fixed ground supported rails adjacent to the scale but the platform rails are disconnected from the ground supported rails by an open joint at either end so that the rail section carried by the platform scale is free to move vertically. In such arrangements, the load resting on the scale may be sensed by various means such as, for example, a mechanical weighing system or by the use of load cells.

With scales of this type, the usual requirement of a stiff solid support for the scale has resulted in the use of a massive expensive scale foundation. Because of the size and expense of such scale installations, their use has been restricted to selected fixed locations. As a result, a need has developed for a scale which is expensive, can be readily installed at almost any location, can be moved to a new location without extensive cost and which will provide acceptable weighing accuracy.

In addition to the expense involved, massive rigid foundations pose a particularly troublesome problem when the vehicle is to be weighed while in motion. In particular, rails under load of a moving vehicle exhibit two properties which must be considered if acceptable weighing accuracy is to be achieved. Thus, because the rail and its supporting ties flex or deflect under the wheel load, the train normally moves on a somewhat lower level than the nominal level defined by the wheel engaging surface of the unloaded rail. At the same time, oscillations in the vertical plane are produced due to the deflection of the rail between the adjacent supporting ties. When the train passes over a weighing device which utilizes a massive rigid foundation, the elastic properties of the relatively rigidly supported platform rails are substantially different from the elastic properties of the ground supported rails. The vehicle thus experiences a sudden stiffening of the rail support which substantially reduces the flexing of the rails and entirely eliminates the oscillations due to the deflection between ties, with the result that the vehicle is, in effect, "lifted-up." This in turn causes uncontrolled changes in the vertical forces acting on a vehicle as it is being weighed while in motion.

It has been proposed to solve the problem of a sudden lift in the vehicle by extending the scale foundation in both directions along the tracks with the foundation gradually being softened or weakened toward its ends so that a gradual transition is provided between the rails supported on the ties and the rails supported on the rigid foundation. However, this solution has not proven to be satisfactory since even the transition approaches substantially alter the frequency of oscillation as the vehicle passes. Moreover, the cost of such installations is excessive.

It is a primary object of this invention to provide a weigh device for the static or dynamic weighing of railway guided vehicles which overcomes the foregoing problems, as well as others, and provides a weighing device which is inexpensive to produce and install and provides weighing with acceptable accuracy.

It is a further object of this invention to provide a weigh device which may be preassembled in the factory as a unit and installed on site by conventional railway building techniques.

More particularly, in one form of the invention the weigh device comprises a weigh rail which is adapted to replace a section of the normal rail in the railway system with the weigh rail being supported at either end such that the weigh rail is isolated from axial and bending forces imposed by the adjacent rails. A pair of shear sensing strain gages are spaced along the longitudinal neutral axis of the weigh rail and are operative to sense strains due to shear forces in the rails and thereby produce readings which are proportional to the applied load of the vehicle.

In accordance with a further aspect of the invention, a structural member such as a channel or an I-beam is provided as a foundation for the weigh rail with the foundation resting on the sleepers or ties and extending beyond the weigh rail in both directions. The foundation is designed such that its bending stiffness increases in both directions to a maximum at the location of the weigh rail and serves to dampen the oscillations of the vehicle as it approaches and passes over the weigh device.

In accordance with a further aspect of the invention, the weigh rail is provided with start and stop strain sensing gages with the start and stop gages functioning to sense when the wheel of the vehicle passes thereby to start and stop the weighing process.

Other aspects and objects of the invention will be more apparent upon a complete reading of the following description which, together with the attached drawings, discloses but certain preferred forms of the invention.

Referring now to the drawings wherein like reference numerals indicate like parts in the various views:

FIG. 1 is a side elevational view of a weighing device constructed in accordance with this invention incorporated in a railway system.

FIG. 1($a$) is a sectional view along line 1$a$—1$a$ of FIG. 1.

FIG. 1($b$) is a moment of inertia diagram of the channel foundation employed in the device of FIG. 1.

FIG. 2 is a side elevation view of a weigh device as a vehicle wheel passes onto the weigh rail.

FIG. 2($a$) is a shear force diagram of the weigh rail of FIG. 2.

FIGS. 2($b$) and 2($c$) graphically illustrate start and stop signals generated by the start and stop gages as the wheel passes thereover.

FIGS. 2($d$) and 2($e$) are graphic presentations of the summed outputs of the start and stop gages and the summed weight signals, respectively, generated by the strain gages as a vehicle wheel passes thereover.

FIG. 3 illustrates a modified form of the weigh rail.

FIG. 3($a$) is a sectional view along line 3$a$—3$a$ of FIG. 3.

FIG. 3($b$) is a sectional view along line 3$b$—3$b$ of FIG. 3.

FIG. 4 is a top plan view of a weigh rail incorporated in a railway system and illustrates the manner in which the weigh rail may be restrained to prevent sideways movement.

FIG. 5 is a side elevation view of a modified form of a weigh rail support.

FIG. 6 is a side elevation view of a weigh device in which an I-beam is used as the foundation.

FIG. 7 is a top plan view of a weigh device and illustrates the manner in which the adjacent ends of the connecting rails may be restrained by spacer plates.

FIG. 8 is a view along line 8—8 of FIG. 7.

Referring now more in detail to the drawings, and particularly FIG. 1 thereof, a weigh device indicated generally by the reference numeral 10 is illustrated as it would be installed in a conventional railway system. The weigh device 10 includes a weigh rail 12 which is adapted to replace a section of the usual rail with the weigh rail being aligned with the adjacent ends 14, 16 of the conventional rail. The upper surface of the weigh rail 12 is coplanar with the wheel supporting surface of the adjacent rails to provide a continuous surface along which the wheel W of a vehicle may pass. However, the ends of the weigh rail 12 are axially separated by a small space from the adjacent rail ends 14, 16. The weigh rail 12 is supported at its ends by reaction supports $Ra$, $Rb$.

The weigh rail 12 has a weigh section which includes a pair of gaged measuring sections 18, 20. As shown in FIG. 1a, the gaged measuring sections of the weigh rail are preferably I-shaped in cross-section which defines recesses 22, 24 on either side of the rail at each measuring section. Strain gages 26 are secured to the web of the rail in each of the recesses at the measuring section 18 and strain gages 28 are similarly positioned in each of the recesses at measuring section 20.

As shown in FIG. 2, each of the gages 26, 28 is oriented essentially at 45° to the longitudinal neutral axis of the weigh rail 12 so that the strain gages are operative to sense strains due to shear forces in the rails and thereby produce readings which are proportional to the applied force F exerted by the wheel W. As will be appreciated, with the gages 26, 28 centered on the neutral axis, any strains in the portion of the gages above the axis caused by bending moments is offset or compensated by strains of opposite polarity and equal magnitude in the portion of the gages below the neutral axis. Moreover, by positioning the strain gages in the recesses 22, 24, the gages are positioned close to the neutral vertical axis and on either side thereof with the result that the weigh device becomes essentially insensitive to horizontal forces acting transverse to the weigh rail 12.

The weigh rail 12 may also be provided with start and stop measuring gages 30, 32 which are positioned in the recesses 22, 24 at the gaged measuring sections 18, 29 and which may be used to deliver signals which indicate the start and stop of the weighing operations as the vehicle wheel W passes over the weigh rail 12. Thus, as the wheel passes over the gages 30, 32, the shear stress and consequently, the output changes polarity (see FIGS. 2b, 2c and 2d) and this change in polarity can be very easily and accurately detected so that a relatively simple start and stop system is provided. Moreover, since the start and stop system is based on change in polarity, it is insensitive to the direction from which the vehicle wheel approaches the weigh rail 12. Still further, the use of start and stop gages eliminates the need for any form of rail contacts which cooperate with moving parts on the vehicle.

Also illustrated in FIG. 1 is a U-beam foundation support which may be used with the weigh rail 12. This U-beam foundation comprises a channel 36 which rests directly on top of the sleepers or ties 38. Inside the beam are welded standard type rail mounting plates 40 to which the conventional rails are fixedly secured.

The channel shaped U-beam foundation 36 is also provided with side flanges 42 which extend longitudinally of the U-beam. The bending stiffness of the U-beam may be varied by varying the height of the flanges 42. In this manner, the bending stiffness of the U-beam foundation may be increased from a minimum at either end to a maximum adjacent the weigh rail 12. FIG. 1b graphically illustrates the increasing moment of inertia of the U-beam foundation.

The described U-beam foundation eliminates the need for excavating and building a foundation as has been the case with prior art systems. Moreover, the relatively high bending stiffness of the U-beam coupled with its support on a plurality of the sleepers 38 eliminates the possibility of sudden big vertical deflections of the rail which might otherwise occur due to a poorly supported sleeper as the wheel passes along the rail. Still further, the continuously increasing stiffness of the beam also progressively dampens the vertical oscillations of the vehicle as it approaches the weigh rail 12 without drastically altering the frequency of the oscillations. To further minimize the vertical oscillations, the sleeper spacings may be decreased along the U-beam foundation to provide an even more stable support for the weigh device.

It will be apparent that the described weigh device can be readily installed in any existing railway system using essentially conventional railway building techniques. Moreover, the weigh rail 12 can be factory fabricated and assembled with the foundation in the factory so that it can be installed on site very simply and without the need for technically trained personnel. If, subsequent to installation, it is desired for any reason to remove the weigh rail 12, it is but a simple matter to lift the weigh rail 12 out of its assembled location and replace it with a standard dummy rail so that train service along the railway is not interrupted.

Since the weigh rail 12 merely rests on the reaction supports $Ra$, $Rb$ at either end thereof, it is desirable to restrain the weigh rail from sideways movement thereby to assure continued alignment of the weigh rail with the adjacent rail ends 14, 16. This may be accomplished in various ways with two such techniques being shown in FIG. 4. As illustrated in that Figure, one end of the weigh rail 12 is provided with a recess 44 which cooperates with a projecting lug 46 on the adjacent end 16 of the rail. The cooperation of the recess 44 and lug 46 restrain that end of the weigh rail from transverse or sideways movement. An alternative arrangement for restraining the weigh rail is illustrated at the other end of weigh rail 12 in which a suitable keeper 48 is secured to the end 14 of the rail and defines a recess in which the weigh rail is received. In addition, a cross-connection 50 having low resistance to bending and torsion may extend between the weigh rails 12 associated with each of the rail tracks.

Although the weigh rail 12 has been described as being axially spaced a small distance from the rail ends 14, 16, in practice the rail 12 may shift longitudinally until it physically abuts one or the other of the ends 14, 16 without adversely affecting the weighing operation.

Nor does the frictional engagement between either lug 46 and recess 44 or keeper 48 have any significant detrimental effect on the weighing accuracy of the device. In general, the relationship between the weigh rail 12 and rail ends 14, 16 should be such that the rail ends do not exert axial compressive forces which would tend to buckle or bend the weigh section of the weigh rail. Accordingly, although an axial space between rail 12 and rail ends 14, 16 is disclosed, techniques other than a physical axial separation with side guiding may be employed.

It is also to be noted that, although the weigh rail 12 has been described as merely resting in position between the rail ends, it may be secured to the foundation 36 as by welding or by any other suitable means.

Referring now to FIGS. 3, 3a and 3b, a weigh rail 12' essentially of the same construction as that shown in FIG. 1 is illustrated. However, the radius of the wheel engaging surface of the rail has been reduced in the mid-section of the weigh rail, as shown at 52 in order to secure a centered loading as the wheel rolls along the weigh rail. The radius of the top surface of the rail at either end of the weigh rail 12' has been maintained the same as the adjacent ends 14, 16 to avoid transition problems at the connecting rail interfaces.

A modified form of weigh rail support is illustrated in FIG. 5 wherein a pair of pedestal supports 54 support the weigh rail 12' at its longitudinal neutral axis. This arrangement of supporting the rail at its neutral axis has the advantage of eliminating undesired second order bending effects.

While a channel shaped foundation 36 is the preferred arrangement, other structural shapes may be used, if desired. For example, FIG. 6 illustrates the use of an I-beam 56 which is positioned in a shallow excavation beneath the rails and, if desired, rests on ties or sleepers. As in the embodiment of FIG. 1, the height of the I-beam is tapered from both ends to provide a foundation with increasing bending stiffness with the maximum in the area of the weigh rail.

FIGS. 7 and 8 illustrate the use of the weigh rail 12 without any structural foundation support. As illustrated in FIG. 8, the weigh rail 12 rests directly on flat plates 60 which in turn are supported on the sleepers 38. A pair of spacer plates 62, 64 interconnect the rail ends 14, 16. The spacer plates serve to restrain the rail ends against longitudinal movement which might otherwise occur due to thermal expansion and contraction and thereby prevent the application of compressive forces to the rail 12. It is preferred that the plates 62, 64 have a moment of inertia which generally coincides with that of rails 14, 16 so that their resistance to bending is similar to that of the rails.

The plates 62, 64 may also be provided with notched openings 66 which cooperate with the ends of weigh rail 12 to provide lateral restraint for the weigh rail and maintain it in alignment with the two rail ends.

While the invention has been described with particular reference to certain embodiments, neither the illustrated embodiments nor the terminology employed in describing them is intended to be limiting; rather, it is intended to be limited only by the scope of the appended claims.

Having thus described the invention, what is claimed is:

1. A weigh device for weighing of railway guided vehicles comprising a weigh rail adapted to be operatively associated with the rails in a railway system, gage means connected to said weigh rail at spaced locations therealong with said gage means being arranged to sense the strain in said weigh rail due to shear forces and produce signals proportional to the load applied to said weigh rail, and indicator gage means being arranged to sense the strain in said weigh rail due to shear forces whereby the signal produced by said indicator gage means is operative to produce a signal indicative of a wheel of a vehicle passing thereover by a change in polarity of the signal as a wheel passes.

2. The weigh device of claim 1 wherein said indicator strain gage means comprise a pair of indicator gage means positioned between said spaced gage means for signalling the start and stop of the weighing operation.

3. A system for weighing railway guided vehicles comprising longitudinally extending rail means adapted to cooperate with and support the wheel of a railway vehicle, a plurality of ground support ties underlying and extending transverse to said rail means for supporting said rail means, said rail means including longitudinally spaced apart first and second rail sections defining a space therebetween, a weigh device having at least a portion thereof positioned in the space between said sections, foundation means supported on said ground support ties with said first and second sections and said portion of said weigh device supported by said foundation means, and means rigidly interconnecting said first and second sections to said foundation means for restraining longitudinal movement of said sections.

4. The system of claim 3 wherein said foundation means comprises a pair of spacer plates secured to said first and second sections on either side thereof.

5. A system for weighing railway guided vehicles comprising:

longitudinally extending rail means adapted to cooperate with and support the wheels of a railway vehicle, a plurality of individual spaced apart ground supports extending transversely to and underlying said rail means, a weigh device operatively associated with a portion of said rail means, and a longitudinally extending structural beam foundation, said beam foundation being positioned beneath said portion of said rail means and extending longitudinally in both directions therefrom with said beam foundation being supported on said ground supports and supporting said weigh device.

6. The system of claim 5 wherein said beam foundation is generally channel shaped.

7. The system of claim 5 wherein said beam foundation comprises an I-beam.

8. A system for weighing railway guided vehicles including:

longitudinally extending rail means adapted to cooperate with and support the wheels of a railway vehicle, a plurality of spaced apart support ties underlying and extending transverse to said rail means, said rail means including longitudinally spaced apart first and second rail sections defining a space therebetween, weigh rail means positioned in the space between said first and second rail sections, means operatively supporting said weigh rail means at either end thereof on said support ties, said weigh rail means including a weigh section having a pair of longitudinally spaced apart shear sensing gage means secured to said weigh rail means with said gage means being arranged to sense the strain in said weigh rail means due to shear forces as the vehicle wheel passes thereover, and means restraining longitudinal movement of said adjacent rail ends for protecting said weigh rail means from being subjected to longitudinal compressive forces exerted by said adjacent rail ends.

9. The system of claim 8 and further including start and stop strain gages longitudinally spaced along and secured to said weigh rail means, said start and stop strain gages being operative to produce an electrical signal indicating the passage of a vehicle wheel thereover.

10. The system of claim 8 wherein the wheel supporting surface of said weigh rail has a reduced radius along the mid-portion thereof.

11. The system of claim 8 wherein said weigh rail has an I-shaped cross-section at least at the locations of said strain gages with said strain gages being secured to the web portion formed by said I-shaped cross-section.

12. The system of claim 8 and further including means co-operating with said weigh rail means to restrain movement of said weigh rail means transversely of said first and second rail sections.

13. The system of claim 8 wherein said means for preventing said weigh section includes spacer means secured to and interconnecting the adjacent ends of said first and second rail sections.

14. The system of claim 8 wherein said means for protecting said weigh section comprises a space defined between at least one end of said weigh rail means and the adjacent rail end.

15. The system of claim 8 wherein said support means support said weigh rail means at its longitudinal neutral axis.

16. The system of claim 8 wherein said means operatively supporting said weigh rail means comprises structural foundation means supported on said ties and extending longitudinally of and supporting the adjacent ends of said first and second rail stations and said weigh rail means.

17. The system of claim 16 wherein said structural foundation means is channel shaped and constructed to have a moment of inertia which progressively increases toward the location of said weigh rail.

* * * * *